Sept. 16, 1952   R. LE BRON ET AL   2,610,685
SHEET METAL CUTTING APPARATUS
Filed Aug. 15, 1947   2 SHEETS—SHEET 1
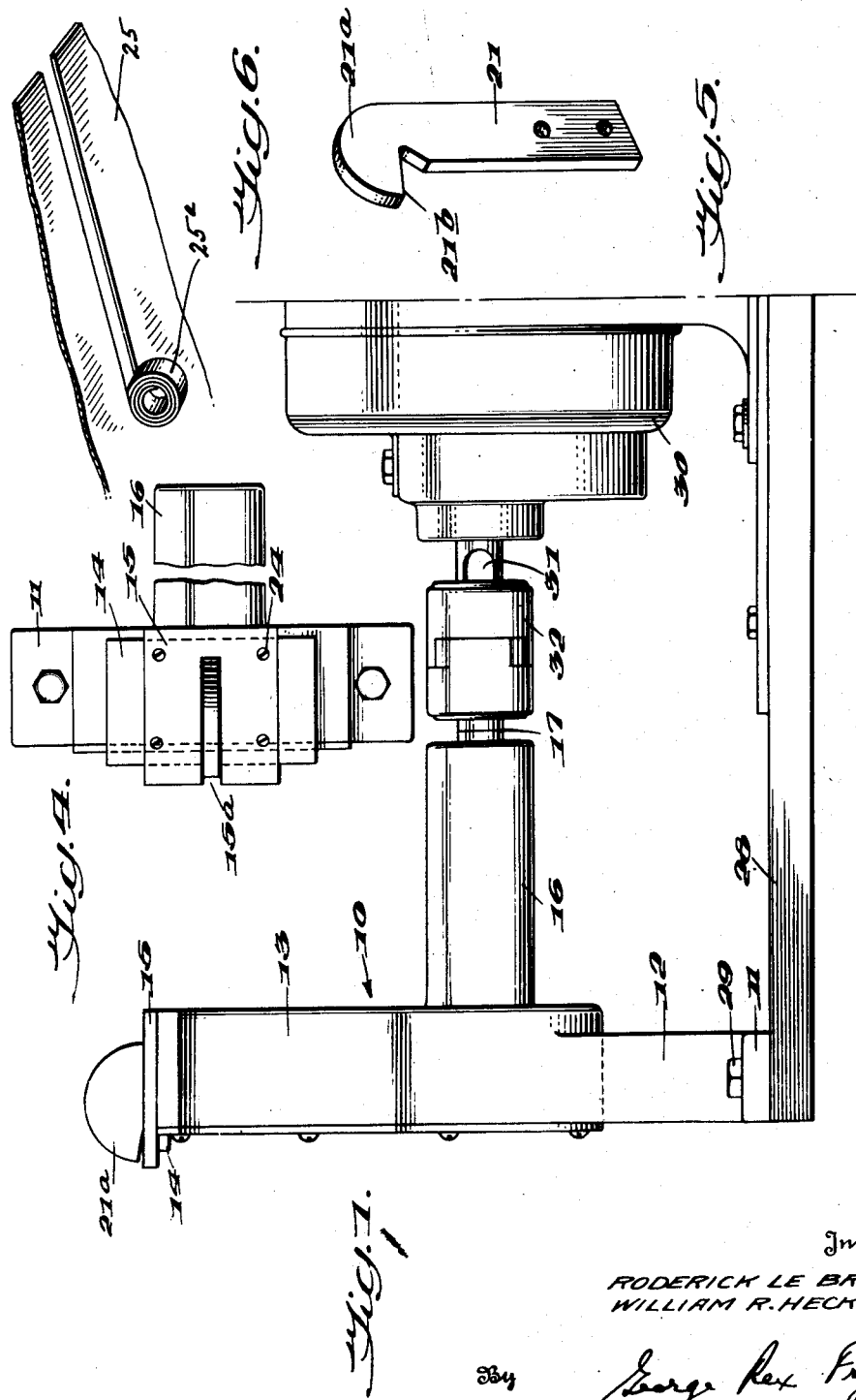
Inventors
RODERICK LE BRON,
WILLIAM R. HECK,
By George Rex Frye.
Attorney

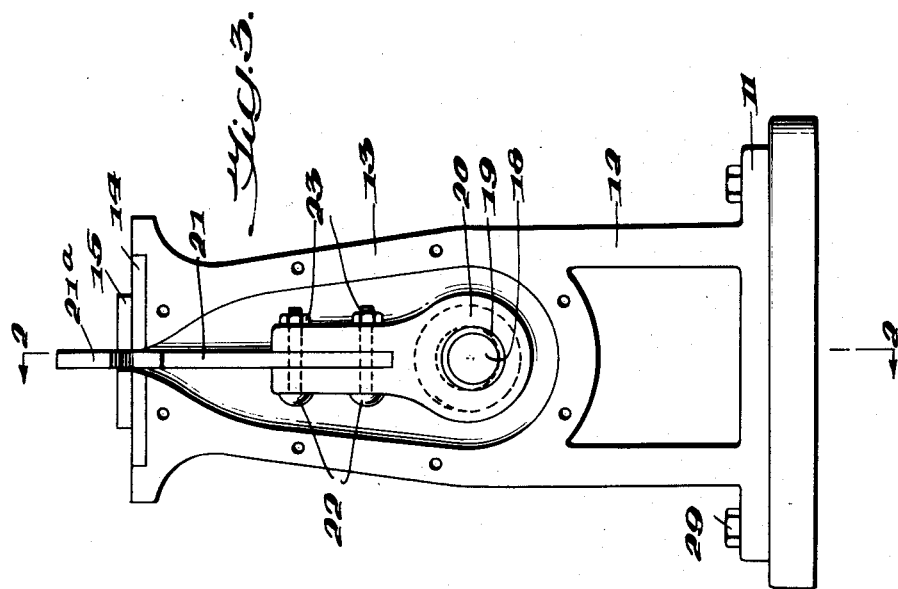
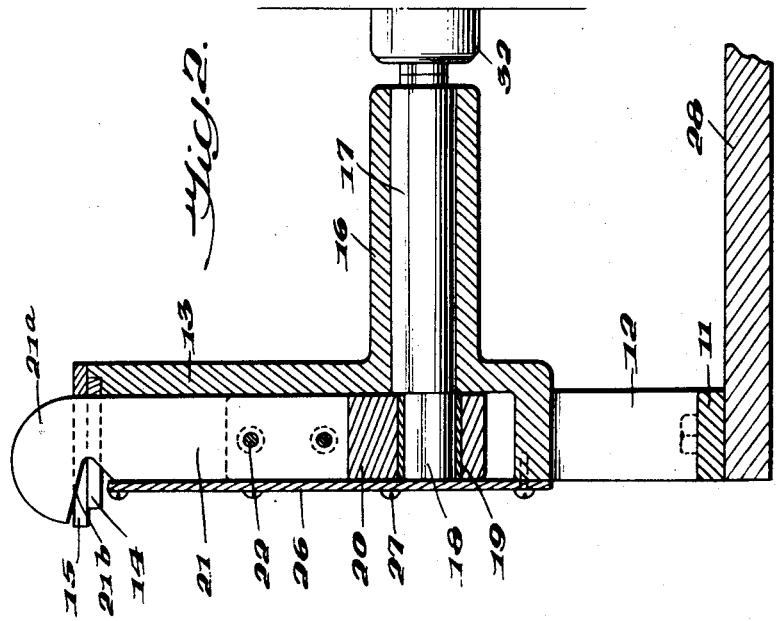

Patented Sept. 16, 1952

2,610,685

UNITED STATES PATENT OFFICE 2,610,685

SHEET METAL CUTTING APPARATUS

Roderick Le Bron and William R. Heck, Omaha, Nebr.

Application August 15, 1947, Serial No. 768,770

1 Claim. (Cl. 164—47)

This invention relates to apparatus for cutting sheet metal or other sheet material, and has for its principal object the provision of a simple, rugged and inexpensive apparatus for cutting sheets of various thicknesses and of any desired widths or lengths.

Another object of this invention is the construction of a light and compact sheet cutting apparatus that is portable and readily set up on the job or in the shop.

A further object of this invention is the arrangement of a reciprocable cutter member for movement within the slot of a slotted stationary cutter member so as to be reciprocated through an eccentric mounting driven by a suitable medium, such as an electric motor, portable electric drill, or the like, the only supports for the reciprocable cutter member being such eccentric mounting and the walls of such slot.

A further object of this invention is the provision of a sheet cutting apparatus with its slotted horizontal stationary cutter member forming a support for the sheet being cut adjacent the lines of severance, and with no member extending above such support except a portion of the cooperating reciprocable cutter member, whereby ample space is made available adjacent the cutters and there is nothing to limit the lateral extent of the sheet being cut or its travel to and from the cutters.

A further object of this invention is the provision of a sheet cutting apparatus having a stationary cutter member slotted inwardly from its front face and a reciprocable cutter member of slightly less width than such slot arranged to effect a severance of the sheet at each side wall of the slot, whereby a ribbon of severed material is removed from the sheet, which ribbon is curled beneath the stationary cutter and forwardly of the apparatus.

A further object of this invention is the provision of a sheet cutting apparatus wherein the cutter members are accessible to permit ready removal for sharpening or substitution by others having the same or a different effective cutting width, whereby the width of the ribbon severed from the sheet may be varied at will.

Other objects and advantageous features of the invention will be apparent from the following detailed description and accompanying drawings, wherein, for purposes of non-limitative disclosure only, a presently preferred embodiment of the invention is set forth.

In the drawings:

Figure 1 is a side elevation of our improved sheet cutting apparatus coupled for operation from the shaft of an electric motor, which is mounted on the same base member as the cutting apparatus.

Figure 2 is a vertical section through the sheet cutting apparatus, taken substantially on line 2—2 of Figure 3.

Figure 3 is a front elevation of the sheet cutting apparatus, with the front cover plate removed.

Figure 4 is a plan view of the sheet cutting apparatus, with parts broken away.

Figure 5 is a perspective view of the reciprocable cutter member, and

Figure 6 is a perspective view of a sheet cut by our improved cutting apparatus, the ribbon severed therefrom being rolled below the sheet.

Referring now to the drawings, the reference numeral 10 designates the housing for our improved sheet cutting apparatus, herein shown as a casting formed with a base 11 and legs 12 supporting a hollow casing 13 adapted to enclose the major portions of the moving elements of the apparatus. The casing 13 has integral side and back walls machined at the top to receive and position a centrally slotted bed plate 14 upon which is demountably secured the slotted stationary cutter member 15. An elongated bearing member 16 extends rearwardly from the lower portion of casing 13 to support the enlarged central portion of shaft 17. While not herein shown, it will be understood that appropriate linings, anti-friction rollers, etc., may be arranged between the shaft 17 and its bearing member 16 as desired.

The forward extremity of shaft 17 is formed with an eccentric cylindrical projection 18 (Fig. 2) encircled by a bushing 19 which in turn is encircled by the lower portion of a connecting rod 20 demountably carrying in its upper portion the reciprocable cutting member 21. As best shown in Figures 3 and 5, the lower portion of the reciprocable cutter member 21 is provided with spaced apertures adapted to align with similarly spaced apertures in connecting rod 20 when the cutting member 21 is positioned within an elongated recess in the upper portion of the connecting rod. Bolts 22 are then passed through the aligned apertures and nuts 23 turned to firmly secure the cutter member 21 in position.

The reciprocable cutter member 21 is provided with a head 21a extending forwardly of the body portion of the cutter member (Fig. 5) and the side edges of the lower forward portion 21b of the head 21a form the cutting edges of the apparatus in conjunction with the side walls of the slot in the stationary cutter member 15. As shown in Figures 1 and 2, such lower forward portion 21b of head 21a is inclined and extends rearwardly beyond the forward edge of the body portion of the reciprocable cutter member 21, a substantially V-shaped notch being formed in such body portion. The extent of reciprocatory travel of cutter member 21 is such that the inclined cutting portion 21b is moved above and then below the upper surface of the stationary cutter member 15, the desired cut in the sheet material being obtained during the downward stroke of the inclined cutting portion 21b.

The stationary cutter member 15 is firmly secured upon the bed plate 14, as by screw 24 (Fig. 4), and extends forwardly of the bed plate. The slot 15ª in cutter member 15 is open at the front end and overlies the slot in bed plate 14 (Fig. 3), which latter slot is preferably widened at the bottom to facilitate clearance of the ribbon of material severed from the sheet being cut. The side walls of slot 15ª are preferably parallel throughout, and the upper edges of such side walls serve as cutting edges in conjunction with the head 21ª of the reciprocable cutter member. The width of head 21ª is only slightly less than the distance between the side walls of slot 15ª to enable lateral support of head 21ª during its upstroke by such side walls and clean parallel cuts in the sheet adjacent each side wall during the downstroke. This results in the severance from a sheet 25 of a ribbon 25ª (Fig. 6) substantially equal in width to the width of slot 15ª in the stationary cutter member. The inclined cutting portion 21b of the reciprocable cutter member progressively effects the severance of ribbon 25ª from sheet 25 during each downstroke, beginning at its lower rear portion and moving toward its higher forward extremity, and also forces the severed ribbon 25ª downwardly and forwardly to a position below bed plate 14 and in front of the apparatus. As the sheet 25 is fed manually to enable continued severance the ribbon 25ª is curled below the sheet, substantially as shown in Figure 6.

A front coverplate 26 is detachably mounted, as by screws 27, over casing 13. When this coverplate is removed, access is readily afforded to bolts 22 securing the reciprocable cutter member 21 upon the connecting rod 20. The cutter members 15 and 21 may be quickly removed whenever desired, as for sharpening or replacement by another pair, which replacement may be formed to cut a ribbon of the same or a different width.

As shown in Figure 1, our improved cutting apparatus is secured upon one extremity of a base plate 28, as by bolts 29, which base plate also supports an electric motor 30, the shaft 31 of which is directly coupled to shaft 17 of the cutting apparatus, as through a suitable coupling 32. However, many other arrangements for driving my improved cutting apparatus are possible. The illustrated embodiment is one which can be permanently mounted in the shop, or when equipped with a medium size motor may be carried in a vehicle and connected up at the job with a suitable source of current. It is not necessary to carry the motor 30 along with the cutting apparatus if another suitable driving mechanism is available at the job. It has been found that connection may be readily made with the shaft of a portable electric drill and the cutting apparatus adequately powered thereby.

While the illustrated embodiment is believed to adequately disclose the construction and advantages of our improved sheet material cutting apparatus, it is to be understood that various changes and modifications may be made therein without departing from the spirit and scope of the invention as defined in the appended claim.

We claim:

Sheet metal cutting apparatus comprising a frame embodying a stationary cutter member having a slot therein open at its forward end, the margins of said slot constituting cutting edges, a reciprocable cutter member including an actuating arm extending through said slot and a cutter head at the extremity thereof having cutting edges inclined in an upward and forward direction with respect to the edges of said slot, the edges of said cutter head extending from a point within the body of said actuating arm to a point beyond the forward side of said actuating arm, the forward side of said actuating arm being recessed inwardly to provide an upwardly inclined portion the edges of which intersect the inner extremities of said cutting edges and thereby form a notch within the arm immediately below said cutting edges, whereby on relative movement of said cutter head through the slot the ribbon cut from the sheet metal is bent forwardly on engagement with the base of said notch and deflected into an expanding spiral roll as the cutting operation continues; and a drive shaft rotatably mounted in said frame, the actuating arm at a point remote from the cutter head being eccentrically mounted on such shaft to provide a stroke whereby said cutting edges will sever the work solely along said cutting edges.

RODERICK LE BRON.
WILLIAM R. HECK.

REFERENCES CITED

The following references are of record in the file of this patent:

UNITED STATES PATENTS

| Number | Name | Date |
|---|---|---|
| 69,786 | Eynon | Oct. 15, 1867 |
| 341,700 | Stimson | May 11, 1886 |
| 1,737,884 | Hexdall | Dec. 3, 1929 |
| 2,035,443 | Anderson | Mar. 31, 1936 |
| 2,256,779 | McHenry | Sept. 23, 1941 |

FOREIGN PATENTS

| Number | Country | Date |
|---|---|---|
| 554,531 | France | Mar. 2, 1923 |
| 532,707 | Great Britain | Jan. 29, 1941 |